United States Patent [19]
Vincent

[11] 4,034,608
[45] July 12, 1977

[54] AUTOMOTIVE OIL GAUGE

[76] Inventor: Dixon J. Vincent, 585-25½ Road, Box 4, Grand Junction, Colo. 81501

[21] Appl. No.: 700,056

[22] Filed: June 25, 1976

[51] Int. Cl.² .................................... G01F 23/10
[52] U.S. Cl. ............................ 73/313; 73/318; 338/33; 340/59; 340/244 B
[58] Field of Search ............... 73/313, 308, 318; 340/244 B, 59; 33/126.7 R, 126.7 A; 338/33

[56] References Cited
U.S. PATENT DOCUMENTS

| | | | |
|---|---|---|---|
| 2,127,422 | 8/1938 | Phaneuf | 340/244 B |
| 2,598,835 | 6/1952 | Ryan | 73/314 |
| 2,604,522 | 7/1952 | Monroe | 340/244 B |
| 2,820,957 | 1/1958 | McDougal | 340/244 B |
| 3,002,186 | 9/1961 | Schlangen | 73/308 X |
| 3,279,380 | 10/1966 | Clark | 340/244 B |

Primary Examiner—Richard C. Queisser
Assistant Examiner—Daniel M. Yasich

[57] ABSTRACT

A device designed to replace the conventional automotive dipstick wherein the level of oil in an automotive crankcase is continually monitored by means of a direct readout on a visual gauge mounted on a vehicle dashboard or other convenient location within the automotive passenger compartment. The device consists of a length of cylindrical tubing threadably adjustable within a cap to predetermine its overall length as required by the specific oil reservoir, a float mechanism attached to the bottom end of the cylinder tubing, with the float being mechanically and electrically connected to a float resistor. The float lowers as the oil in the crankcase is depleted so as to register a corresponding reading on the visual gauge in the automotive passenger compartment.

5 Claims, 4 Drawing Figures

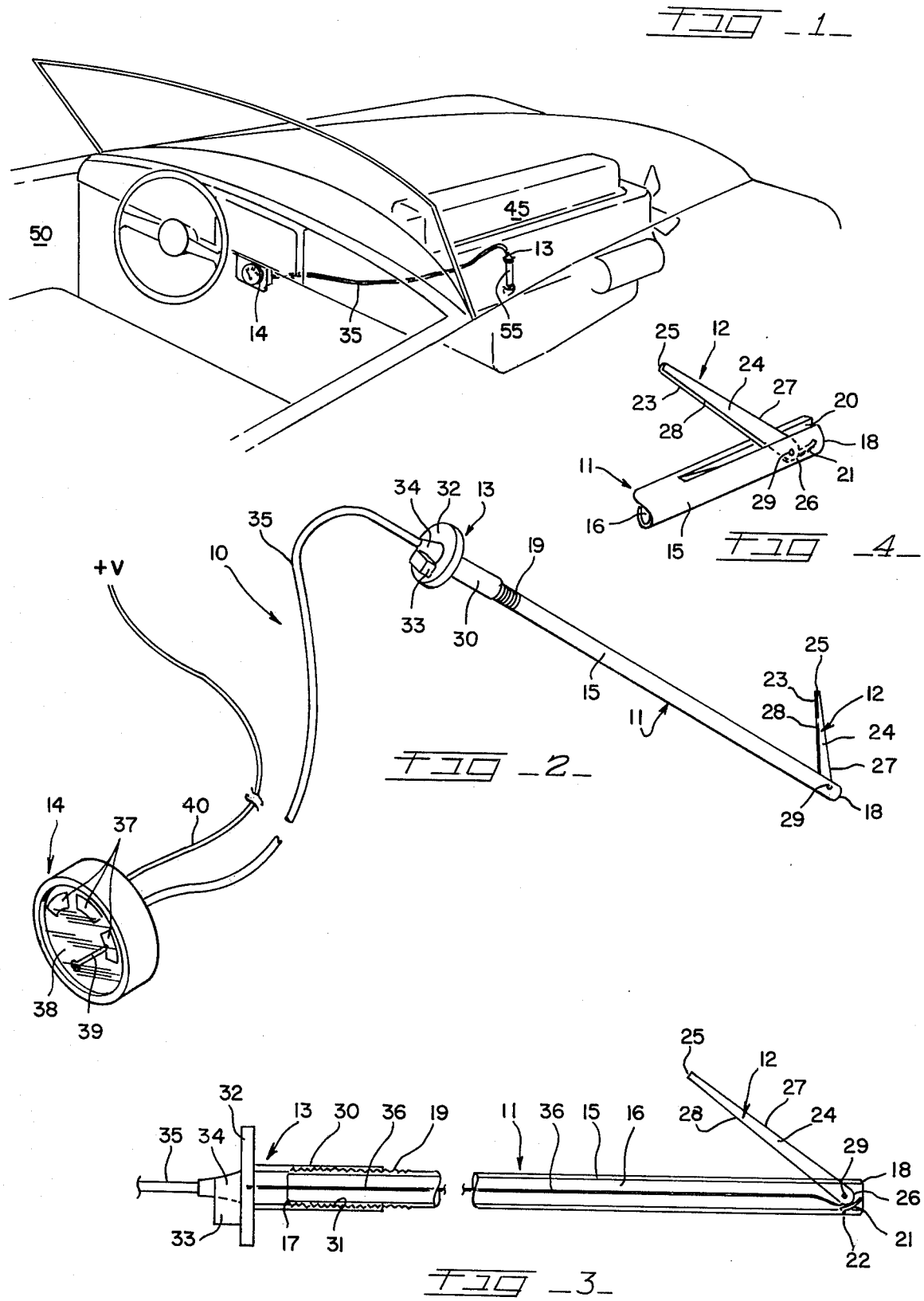

AUTOMOTIVE OIL GAUGE

BACKGROUND OF THE INVENTION

1. Field of the Invention

This invention relates to an automotive oil gauge that replaces a conventional dipstick and provides a continuous visual readout of the oil level in a crankcase on a visual gauge in an automotive passenger compartment.

2. Description of the Prior Art

It has always been a problem for drivers of automotive vehicles to be made aware of excessive oil usage in an automotive crankcase. Long distances can sometimes be traveled in an automotive vehicle before its driver realizes a low oil level, this often causing damage to the vehicle engine with costly repairs necessary as a result. The most commonly employed technique for checking the level of oil in a crankcase requires one to open the hood over the automotive engine and to check the oil level as shown on a dipstick which must be manually removed from the spout of an oil reservoir. More sophisticated methods are available, but they are generally complex and expensive to manufacture so as to be impractical, or they merely measure oil pressure and do not indicate when smaller quantities of oil should be added to the reservoir. For example, U.S. Pat. No. 1,564,535 issued to Davis Dec. 8, 1925 describes an oil gauge which may be manipulated for observation of the oil level from a point on the outer side of a running board shield, consisting of a pivotally mounted spout, means for moving the spout on its pivotal support, consisting of a pivotally connected rod, a hand grip, and a spring for maintaining the rod in position, with the oil gauge mounted directly into the wall of an oil reservoir. U.S. Pat. No. 2,800,648 issued to Kelly July 23, 1957 illustrates a liquid level indicating device for indicating the oil level in the crankcase of an internal combustion engine and consisting of complicated electrical circuits, switches, bulbs, a plurality of chambers each having a moveable wall, an oil pump for circulating oil under pressure, and other complicated mechanisms. U.S. Pat. No. 1,583,941 issued to Swiggart ET. AL. May 11, 1926 illustrates an oil level indicator comprising a valve casing having a conduit therethrough and a port, a valve mounted with a standpipe, a collar tightened in place with a nut, and other components. U.S. Pat. No. 2,043,877 issued to Ashworth June 9, 1936 shows an oil level indicator to replace the conventional dipstick, but which is connected to a compressible bulb within the vehicle passenger compartment by means of a flexible tubular member for determining the oil level in a crankcase by means of suction. Consequently, it can be readily seen that there is no simple and effective means available for determining the level of oil in an automotive crankcase by means of a visual gauge within an automotive passenger compartment. There is, then, an obvious need in the marketplace for an inexpensive to manufacture and easily installable oil gauge, which may be incorporated into an automotive vehicle during the production process or easily added to a vehicle after manufacture, so as to enable a vehicle driver to readily and visually determine the need to add oil to an automotive crankcase without opening the hood over the vehicle engine.

SUMMARY OF THE INVENTION

The present invention provides an automotive oil gauge for visually and readily determining the level of oil in an automotive crankcase.

It is a feature of the present invention to provide an automotive oil gauge.

A further feature of the present invention provides an automotive oil gauge which is easy to install and reliable and efficient in operation.

Yet still a further feature of the present invention provides an automotive oil gauge which is of a rugged and durable construction and which, therefore, may be guaranteed by the manufacturer to withstand continual usage.

An additional feature of the present invention provides an automotive oil gauge which is simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the automotive oil gauge installed within an automotive vehicle; and FIG. 2 is a perspective view of the automotive oil gauge; and FIG. 3 is a side sectional view of the automotive oil gauge; and FIG. 4 is a partial cut-away view of the float mechanism.

DESCRIPTION OF THE PREFERRED EMBODIMENT

Referring now to the drawings in detail, there is illustrated a preferred form of the automotive oil gauge constructed in accordance with the principles of the present invention and which is designated generally in its entirety by the reference numeral 10 and which is comprised of a cylindrical tube 11, a float mechanism 12, a cap 13, a visual gauge 14, and associated hardware and components as will be later described.

The cylindrical tube 11 is constructed of durable and rigid material, such as metal, and consists of a hollow tube 15 having an interior compartment 16 along its length, a top surface 17 and an opposed bottom surface 18, with the tube 15 being provided with external threads 19 running a short distance along its length from the top surface 17 and a slot 20 provided a short distance along the length of the tube 15 from the bottom surface 18. A leaf spring 21, constructed of a small strip of spring steel, is affixed within the interior compartment 16 onto the inside surface of the hollow tube 15 by means of a rivet 22 in a conventional way so that the leaf spring 21 is positioned near the bottom surface 18 so that the spring 21 is axially aligned with the slot 20 so that the portion of the leaf spring 21 that is riveted to the tubing 15 is flattened against the inside surface within the interior compartment 16 and with the tip of the leaf spring 21 adjacent the bottom surface 18 being biased inwardly within the interior compartment 16. A round through hole (not shown) is provided through the width of the tube 15 a short distance from the bottom surface 18 and so as to be centrally located between the leaf spring 21 and the slot 20 so that the axis formed by the through holes projecting through the side walls of the tube 15 would be in perpendicular relationship to the axis formed between the slot 20 and the leaf spring 21.

The float mechanism 12 is constructed of durable but buoyant material, such as dense cork or plastic, and consists of opposed side surfaces 23 and 24, a blunt end surface 25 and an opposed rounded end surface 26, a tapered bottom surface 27 and a tapered top surface 28. A round through hole (not shown) is provided centrally a short distance from the end surface 26 so as to be centrally located between the bottom surface 27 and the top surface 28, so that the float mechanism 12 is assembled within the slot 20 in the interior compartment 16 provided in the tube 15 by means of a pin 29 positioned through the through holes (also not shown) provided in the tube 15 and through the hole in the float mechanism 12 so as to provide a freely pivotable rotation thereon with the float mechanism 12 being so positioned within the interior compartment 16 that, when the bottom surface 27 of the float mechanism 12 is projected downwardly from the bottom surface 18 of the tube 15 so that the float mechanism 12 is disposed in the same plane and in axial alignment with the tube 15, the leaf spring 21 is compressed against the inside surface of the tube 15 within the interior compartment 16.

The cap 13 consists of a length of cylindrical tubing 30 slightly larger in diameter than the outside of the diameter of the hollow tube 15 and provided with internal threads 31 along the length of its inside wall to provide threadable engagement to the external threads 19 on the tube 15, with the tube 30 securely affixed on one end to a cylindrical plate 32 to which is affixed a float resistor 33 located away from the center of the plate 32 and upwardly from the tube 30, a flexible wire protector 34 affixed centrally to the plate 32 on the same surface as the float resistor 33 and through which the wire 35 is dressed and connected on one end in a conventional way to the float resistor 33 and, as shown in FIG. 2, connected on the opposite end to the visual gauge 14. Additionally, a stiff wire 36 is provided along the length of the internal compartment 16 within the hollow tube 15 and, as shown in FIG. 3, is connected on one end to the end surface 26 of the float mechanism 12 in a conventional way, such as by welding, and is routed through a round through hole (not shown) in the cylindrical plate 32 for connection in a conventional way to the float resister 33.

The visual gauge 14 is a conventional gauge designed to receive electrical impulses from the float resister 33 through the wire 35 to register readings for low, add, or full, as shown by the reference numeral 37 provided on the gauge face 38 by means of a needle 39, with the gauge 14 being hooked in a conventional way to an automotive power supply by means of a wire 40.

In operation, a conventional automotive oil dipstick is not included as part of an automotive engine 45 during the manufacturing process or, in the case of an already purchased automotive vehicle, the conventional dipstick is removed from the engine 45. The visual gauge 14 is assembled in any conventional way within the passenger compartment 50 of an automotive vehicle so as to provide easy display thereof to the vehicle driver, and the wire 35 is depressed in a conventional way from the vehicle compartment 50 to the engine 45. The cap 13 is threadably attached to the hollow tube 15 so that, when the bottom surface 27 of the float mechanism 12 is positioned exactly perpendicularly to the tube 15 within the slot 20, the bottom surface 27 would correspond exactly to the "add" mark on the conventional dipstick required for the particular engine 45. In order to assemble the oil gauge 10 within the oil spout 55 provided on an engine 45, the user would first position the float mechanism 12 so as to extend in the same axis as the tube 15 and outwardly from the bottom surface 18 for insertion of the gauge 10 through the spout 55. When the float mechanism 12 has been inserted within the oil pan or crankcase of the engine 45, the leaf spring 21 will exert pressure on the float mechanism 12 so as to bias the float mechanism 12 angularly from the bottom surface 18 of the hollow tube 15. The float mechanism 12 will then raise or lower in relation to the bottom surface 18 with the addition or decrease of oil respectively within the automotive crankcase so as to raise or lower the wire 36 within the interior compartment 16 to provide varying electrical current readings from the float resistor 33 and to activate accordingly the needle 39 on the gauge 14 for the appropriate low, add, or full reading 37. In this way, when the engine 45 is shut off so that there is no agitation of oil within the engine crankcase, the driver of a vehicle has a reliable and continuous display provided within the passenger compartment 50 of the level of oil in the engine crankcase.

There is thus described a novel automotive oil gauge which meets all of its stated objectives and which overcomes the disadvantages of existing techniques.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention. For example, a float resistor could be hooked up to a float mechanism directly within the interior of an engine crankcase and connected similarly as explained in the specifications above to a visual gauge within the passenger compartment.

Having thus described the invention, what is claimed is:

1. An automotive oil gauge to provide a ready readout of the level of oil in an engine crankcase, the device comprising, in combination:

a cylindrical hollow tube having an interior compartment along its length, a top surface and opposed bottom surface, with said tube being provided with external threads running a short distance along its length from said top surface, with a slot being further provided a short distance along the length of said tube from its bottom surface, and with a leaf spring affixed within the interior compartment of said tube so as to be positioned near said bottom surface and to be axially aligned with said slot with the tip of said leaf spring adjacent said bottom surface being biased inwardly; and a float mechanism consisting of opposed side surfaces, as blunt end surface and an opposed rounded end surface, tapered bottom and top surfaces, with said float mechanism assembled within said slot in the interior compartment of said hollow tube by means of a pin so as to provide a freely pivotable rotation thereon so that, when the bottom surface of said float mechanism is projected downwardly from the bottom surface of said hollow tube, said leaf spring is compressed against the inside surface of said hollow tube; and a cap consisting of a length of cylindrical tubing provided with internal threads for threadable engagement to said external threads on said hollow tube, with said tube securely affixed on one end to a cylindrical plate to which is affixed a float resistor and a flexible wire protector through which a wire is disposed and connected to said float resistor on one end and to a visual gauge on the opposite end; and a stiff wire disposed along the length of the internal compartment of said hollow tube and connected on one end to the rounded end surface of said float mechanism and to said float resistor on its other end; and a visual gauge designed to receive electrical impulses from said float resister to resistor readings for low, add, or full on the face of said gauge by means of a needle.

2. An automotive oil gauge as set forth in claim 1 which replaces a conventional dipstick in the crankcase of an automotive engine.

3. An automotive oil gauge as set forth in claim 1 wherein the power source for operation of said visual gauge and float resistor is the automotive battery.

4. An automotive oil gauge as set forth in claim 1 wherein said float mechanism is projected in axial alignment with said cylindrical tube for insertion into the spout of an automotive crankcase and which is biased angularly after insertion into the spout of automotive crankcase by means of a leaf spring.

5. An automotive oil gauge as set forth in claim 1 wherein the level of oil in an automotive crankcase is continually provided on a visual gauge within a vehicle passenger compartment when the automotive engine has been shut off.

* * * * *